Aug. 9, 1938.  A. D. MacLEAN  2,126,484
APPARATUS FOR CALIBRATING AND PROVING REGISTERS
Original Filed Dec. 27, 1933   2 Sheets-Sheet 1
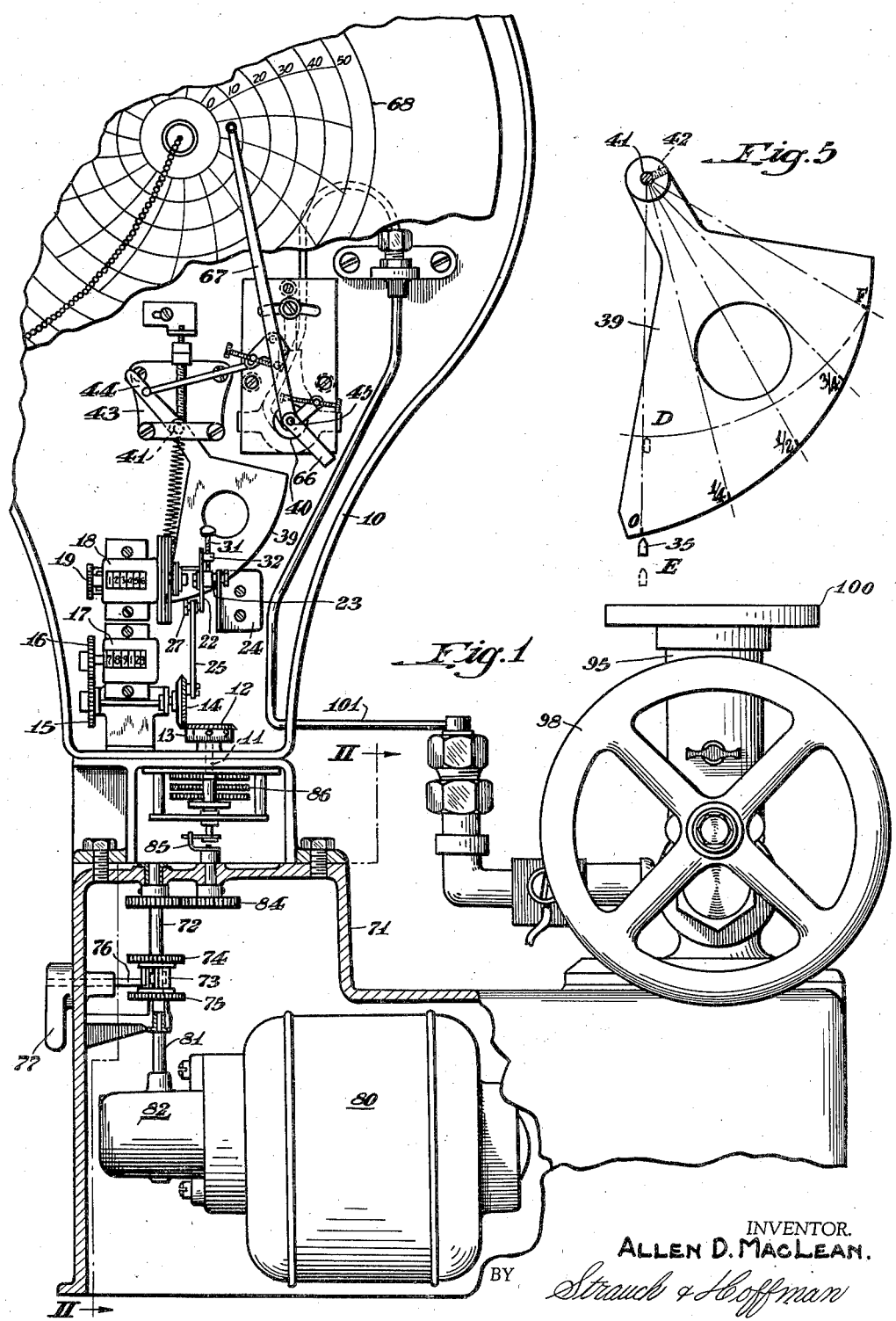
INVENTOR.
ALLEN D. MACLEAN.
BY
Strauch & Hoffman
ATTORNEYS Aug. 9, 1938.     A. D. MacLEAN     2,126,484
APPARATUS FOR CALIBRATING AND PROVING REGISTERS
Original Filed Dec. 27, 1933     2 Sheets-Sheet 2

INVENTOR.
ALLEN D. MacLEAN.
BY Strauch & Hoffman
ATTORNEYS

Patented Aug. 9, 1938

2,126,484

UNITED STATES PATENT OFFICE 2,126,484

APPARATUS FOR CALIBRATING AND PROVING REGISTERS

Allen D. MacLean, Pittsburgh, Pa., assignor to Pittsburgh Equitable Meter Company, Pittsburgh, Pa., a corporation of Pennsylvania Original application December 27, 1933, Serial No. 704,181. Divided and this application October 8, 1936, Serial No. 104,718

1 Claim. (Cl. 73—51)

This invention relates to an improved metering mechanism for directly and accurately registering the total volume of gas passing through the meter reduced to a given base pressure regardless of the actual pressure of the gas being measured. More specifically the invention relates to apparatus for calibrating such mechanism. This application is a division of my application for Apparatus and process for calibrating and proving meters filed December 27, 1933, Serial No. 704,181.

In the usual type displacement meter the volume of gas passed through the meter is measured in volume units without taking into account the mass or density of the gas, which increases when the line pressure is increased and decreases with decrease in pressure. Where gas is sold in large volumes the price is based upon a definite pressure, known as the base pressure, and as often it is impracticable for the gas company to maintain a constant pressure in its lines, or a pressure as low as the base pressure, an ordinary displacement meter would not give a correct indication of the actual weight of gas passed therethrough.

An apparatus for correctly measuring the volume of gas reduced to a base pressure is described and claimed in the copending applications of MacLean and Niesemann, Serial No. 462,843 filed June 21, 1930, and of Allen D. MacLean, Serial No. 554,879 filed August 3, 1931. In this apparatus the displacement meter operates a pressure correcting device having an uncorrected volume counter, and a corrected volume counter driven through the medium of a cam member, and a static pressure element in the pressure correcting device causes the corrected counter to be driven at a rate varied automatically in accordance with the pressure of the gas measured by the displacement meter to register the volume reduced to the base pressure on the corrected volume counter. The present application relates to apparatus for calibrating and testing pressure correcting devices of this type.

This invention therefore has for an object the provision of apparatus for testing such pressure correcting devices to determine the accuracy thereof and correct for errors therein.

A further object is the provision of a testing apparatus having means to apply a known pressure to the pressure element of the pressure correcting device and having means for selectively operating said device manually or by motor to accurately locate the starting and stopping positions and quickly operate the device the required period for testing.

These and various other objects of this invention will be apparent from the following description and the appended claim taken in connection with the accompanying drawings wherein:

Figure 1 is an elevation showing one type of pressure correcting device mounted for testing and calibrating and associated with the preferred means for producing an accurate pressure, and means for driving said device.

Figure 5 is a view partly diagrammatic showing the cam and cooperating clutch arm, the cam being positioned at its base pressure position.

Figure 4:
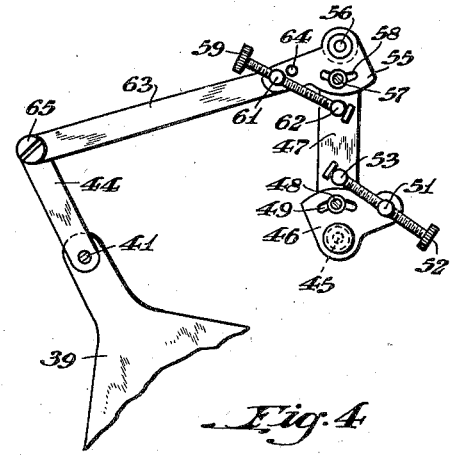
Figure 4 is a detail view showing the adjustment between the cam and pressure element.

Referring to the drawings, Figures 1 to 4, the pressure correcting meter indicated generally by the numeral 10 in practical operation would be connected to a positive type displacement meter of any suitable type, and the measuring element of the positive meter would be suitably connected thereto to cause rotation of the main drive shaft 11. A miter gear 12 is secured to the upper end of the main drive shaft and has a collar or cylindrical portion 13 upon which is marked a graduated scale. The miter gear 12 meshes with a similar miter gear 14 which, through gears 15 and 16, drives the volume counter 17. As the counter 17 is driven by the flow of gas through the displacement meter it will register directly the volume of gas flowing therethrough without regard to the pressure of the gas being measured.

Figure 3:
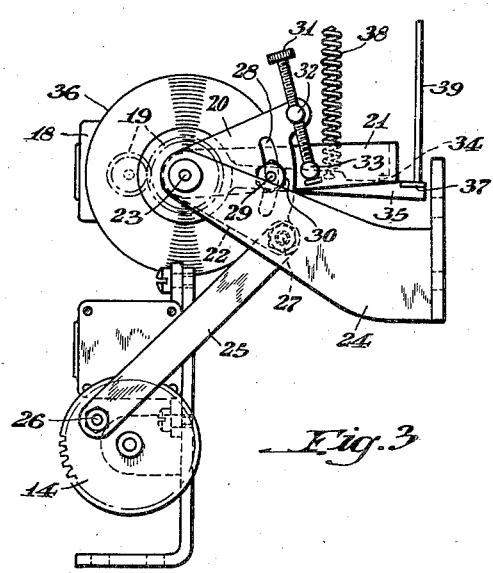
Figure 3 is a detail view showing the arrangement for driving the volume corrected index from the uncorrected index, the cam being at its middle position.

A pressure compensated volume counter 18 is adapted to be driven from gear 14 of the uncorrected volume counter 17 by correcting means and the gearing 19 (Figs. 1 and 3). The correcting means for the corrected counter includes a pivoted lever 20 (Figure 3) made up of a driving arm 21 and a segment 22 which are relatively angularly adjustable, and are adapted to be secured together during operation. The lever 20 is pivoted about the stub shaft 23 on a bracket 24, and is adapted to be oscillated by the connecting link 25 swivelly secured at one end to a crank pin 26 on gear 14, and at its other end swivelly secured to a pin 27 secured on segment 22. The segment 22 has an arcuate slot 28 therein, and a screw 29 secured at one end to arm 21 extends therethrough. The segment 22 is clamped to the arm 21 by the nut 30 or any other suitable means. A fine adjustment between arm 21 and segment 22 can be secured by the threaded adjustment screw 31 which is threaded through the stub 32 on segment 22 and is swivelly connected to a stub 33 on arm 21.

The arm 21 has a laterally projecting portion 34 at its end, and at a certain point in the downward stroke of lever 20 this projection is adapted to engage a clutch arm 35 which is connected to one portion of a one way clutch element 36 of suitable construction through which the pressure corrected volume counter 18 is driven in one direction only. This clutch element is described in detail in the application of Allen D. MacLean Serial No. 554,879 herein before referred to. The extremity of arm 35 is cut out on its center line and the extension 34 engages this cut out portion. The end of the cut out portion has a knife edge 37. Clutch arm 35 is biased upward by spring 38 and the limit of upward movement of arm 35 is governed by engagement of knife edge 37 with the edge of pivoted cam 39, the position of which cam is adjusted by a suitable pressure responsive element 40 (Fig. 1) adapted to be connected to the gas line on which the displacement meter is located. The projection 34 is oscillated about its pivot 23 in an angular path, the limits of which are fixed by the length of link 25, and the ratio of the throws of crank pins 26 and 27. Moreover, the path of projection 34 can be shifted angularly by adjustment of the screw 31 into any desired segment of its circle of movement so as to bring the downward limit of movement of arm 21 into correspondence to absolute zero pressure as will hereinafter appear. It therefore will be seen that the clutch operating stroke of arm 35 is determined by two elements one of which is manually set, namely, the downward limit of the stroke of arm 21, and the other of which is automatically adjusted by the pressure of the gas being measured, namely, the point of engagement of cam 39 and knife edge 37.

The cam 39 is mounted on a shaft 41 (Figures 1 and 5) by a collar having a set screw 42 therein, said shaft being pivotally secured in a suitable bracket 43, and an arm 44 is secured to shaft 41. The pressure element 40 which may be of the helical or Bourdon tube type is adapted to rotate the shaft 45 (Figures 1 and 4) to which is secured the segment 46. Loosely pivoted about shaft 45 is a strap 47 carrying a set screw 48 projecting through a slot 49 in the segment 46. A lug 51 swivelled in an extension of segment 46 has an adjustment screw 52 threaded therein and at its end is swivelled to a similar lug 53 on strap 47. The angular relation between strap 47 and segment 46 can be adjusted by loosening set screw 48 and turning adjustment screw 52.

At the upper end of strap 47 a similar segment 55 is swivelled to strap 47 by a stub shaft 56 and a similar set screw 57 threaded in strap 47 and extending through arcuate slot 58 in segment 55 is adapted to clamp these parts together. The angular adjustment of strap 47 and segment 55 is obtained by turning adjusting screw 59 which is threaded into stub 61 rotatably secured in segment 55 and is swivelly connected at its end to stub 62 on strap 47. A link 63 connects segment 55 to arm 44 and is pivoted at 64 to the segment 55 and at 65 to arm 44. As arm 44 and cam 39 are each rigidly secured to shaft 41, the adjustment between segment 55 and strap 47 will adjust the angular relationship of arm 44 and strap 47.

A U-strap 66 of spring material is secured at one end to shaft 45, and at its other end is frictionally and pivotally secured a pen arm 67, which carries a suitable fountain pen at its end. As shaft 45 is rotated by the pressure element this pen is actuated by the pressure element to trace a pressure record on chart 68 which is rotated by clockwork (not shown) or in any other suitable manner. As the limit of movement of pen arm 67 is fixed by prior practice with respect to chart sizes the pivotal movement of cam 39 which is connected by a linkage to shaft 45 must be correspondingly limited.

The cam 39 (Figure 5) has its edge marked by five division marks, 0, ¼, ½, ¾ and F, the mark F defining the high pressure limit of angular movement of the cam and the mark 0 representing atmospheric pressure, and the inner marks divide the cam into four aliquot parts. As shown, these parts are equiangular, but in other types of cams these parts may be equidistant. The cam 39 is designed so that its radial recession and angular movement are directly proportional to the gauge pressure. In order to reduce the angle of contact between the knife edge 37 and the edge of the cam, the relation of clutch arm 35 to the cam is such that when the cam is moved to where the knife edge is in contact with the ½ position the arm 35 is horizontal. This is clearly shown in Figure 3. By so centering the movement of the cam the angle of contact between the knife edge 37 is reduced to a minimum and slippage is eliminated. If desired the cam edge can be milled to further eliminate slippage.

For testing and calibrating, the pressure correcting meter is driven by a means which comprises a motor and gearing arrangement housed in hollow casing or box 71. At one side the top of casing 71 is provided with a raised seat portion. A shaft 72 mounted in the box 71 carries a collar 73 (Figure 2) to which are secured the gears 74 and 75. The collar 73 is splined to shaft 72 and is slidable therealong by means of a gear shift rod 76 which extends through the box 71 and has an operating lever 77 secured at its outer end. The collar 73 and its gears can be moved to three positions, as will hereinafter appear.

Figure 2:
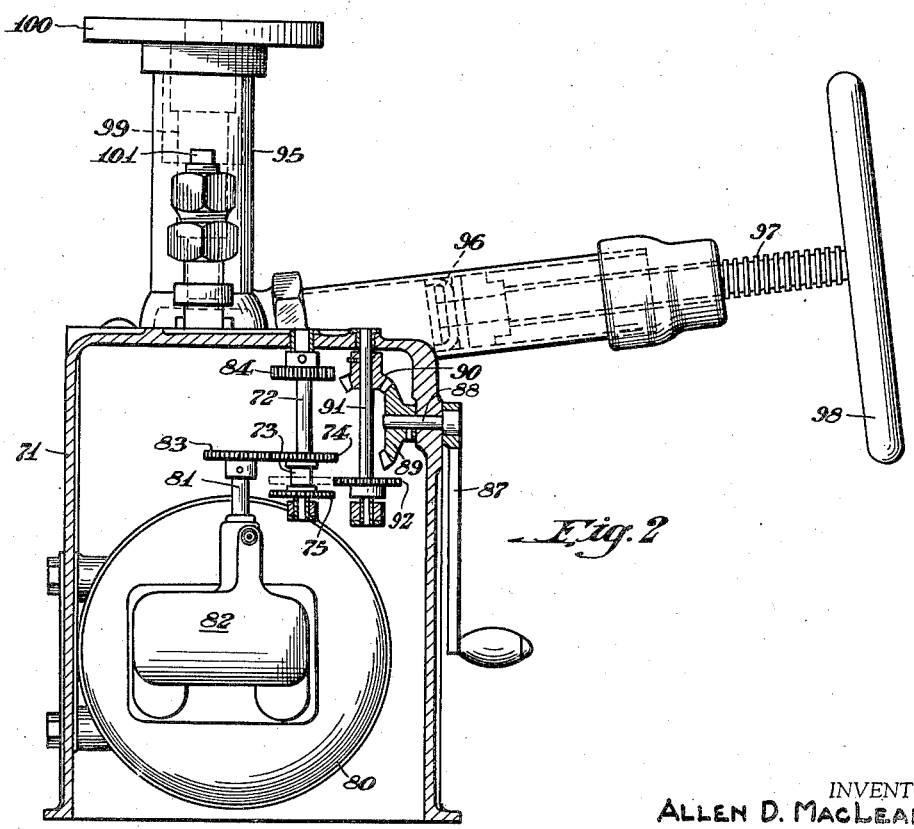
Figure 2 is a view partly in section on line II—II of Figure 1 showing the gearing arrangement for optionally driving said pressure correcting device by hand or electric power.

An electromotor 80 drives the shaft 81 through suitable gearing enclosed in gear case 82, and the shaft 81 has a gear 83 secured at its end. As shown in Figure 2, gears 83 and 74 are in mesh. The main drive shaft 11 of the pressure correcting meter on which gear 12 is secured is driven by the motor through intermediate gearing 84, driving dog 85 and reduction gearing 86. Dog 85 and part of gearing 84 are secured to a substantially vertical shaft which extends through the raised seat portion at the top of the casing to place driving dog 85 in engagement with a cooperating dog on the reduction gearing 86 at the bottom of the meter when the meter is fitted on the seat. The meter is secured firmly on the seat for testing and calibration by bolts or other suitable securing means passing between cooperating portions of the seat and the bottom of the meter. A hand crank 87 is secured to end of shaft 88 extending through the casing and which has a bevel gear 89 on its inner end meshing with a similar bevel gear 90 on counter shaft 91. A gear 92 is secured to the lower end of shaft 91. By means of the gear shift rod 76 the collar 73 can be shifted on shaft 72 to engage gears 83 and 74 or to engage gears 92 and 75. In this latter position the volume correcting meter can be operated by the hand crank 87. In the intermediate or neutral position the gears 74 and 75 are not engaged with either gear 83 or 92.

A dead weight tester 95 is mounted on top of the box 71. As the dead weight tester is of well known construction it need not be described in detail. It comprises in general a cylinder filled with liquid and in which a piston 96 is movable, the piston being operated by the threaded rod 97 and hand wheel 98. A hydraulic piston 99 of accurately measured cross sectional area has a weight support 100 at its upper end and is raised or lowered by action of the threaded rod 97 and piston 96, and the magnitude of the weight placed upon support 100 determines the pressure exerted upon the liquid in the tester. The hydraulic pressure is transmitted through tube 101 to the pressure element 40 of the volume correcting register 10.

The theory of the calibration of the pressure corrector is as follows: When gas is being delivered at the base pressure the counters 17 and 18 should advance at the same numerical rate. With a given gearing ratio in counter 18 and a proper adjustment of the limit of the downward stroke of clutch arm 35, the limit of angular movement of clutch arm 35 will register on counter 18 the same as one complete revolution of gear 14 registers on counter 17 at the base pressure.

Or mathematically stated by Boyle's law, the volumes of gases at different pressures are inversely proportional to their absolute pressures, this law being expressed by the following formula $$(1) \qquad C = \frac{P_a + P}{P_a + P_b}$$

where $P_a$ is absolute atmospheric pressure, $P_b$ is the gauge base pressure of delivered gas and $P$ is a given gauge pressure. When $P$ becomes equal to $P_b$, the multiplier $C$ becomes 1. If the downward limit of movement of clutch arm 35 is set to correspond to absolute zero pressure then when the cam 39 is moved to coincidence with knife edge 37 at a point on the cam corresponding to the base pressure, the two counters will advance at the same numerical rate.

For obtaining proper adjustment of the absolute zero point the procedure is as follows: The meter is securely bolted upon the raised casing seat and the pressure responsive element connection 101 is connected to place the pressure responsive element in fluid communication with the cylinder of the dead weight tester 95. The linkage between the cam 39 and pressure element 40 is adjusted so that when the pen 67 shows zero gauge pressure the zero mark on the cam and knife edge 37 of arm 35 coincide, and when the maximum pressure is shown by pen 67, (in this particular illustration 50 lbs.) the knife edge coincides with the mark F on the cam. By means of the gear shift lever 77 the gears 75 and 92 are engaged, and by turning the crank 87 the volume counter 17 can be rotated manually. This counter is carefully set to a definite position, the graduated collar 13 in conjunction with an index mark on the glass cover (not shown) permitting accurate setting, and the reading is noted. The set screw nut 30 is now released, and the adjusting screw 31 is turned to approximately the position required to provide for proper limit of the downward movement of extension 34 at the absolute zero position E which drives clutch arm 35. A suitable weight is placed on the support 100 to generate a hydrostatic pressure equal to the base pressure, and the handwheel 98 is turned to move piston 96 inward and raise the piston 99. The hydrostatic pressure is transmitted to the pressure element of the corrector 10 through tube 101, and through shaft 45, segment 46, strap 47, segment 55, link 63, arm 44, and shaft 41, the cam is moved to the position shown in Figure 5, which corresponds to the base pressure position.

The gears 83 and 74 are now engaged, and the motor is allowed to turn the counter 17 until nearly one thousand units have been registered. The motor is then disengaged, and the hand crank 87 is engaged so that the remainder of the thousand units can be turned over accurately by hand, the stopping point being accurately determined when the starting mark on the graduated collar 13 is finally brought to register with the index mark on the glass cover. As heretofore explained, upon each downward stroke of lever 20 the extension 34 engages arm 35 at the specific setting of the cam, and moves the arm 35 downward until the absolute zero position is reached, which is the downward limit of the stroke of arm 20. If, when the volume counter advances one thousand units the corrected counter advances one thousand units the adjustment for absolute zero is correct. If not, the lower terminus of the stroke of arm 35 is changed and the test is repeated. By repeated tests the stroke of arm 20 is finally adjusted.

The device now should be checked for accuracy at the maximum pressure position. For this purpose a suitable weight is placed on the support 100 and the handwheel 98 is turned to move piston 96 inward to raise the piston 99. This places the liquid in the dead weight at a hydrostatic pressure of the desired maximum pressure which is transmitted to the pressure element of the corrector 10 through tube 101. The application of this pressure to the pressure element rotates shaft 45 as previously described, and swings the cam 39 about its pivot to cause coincidence of the knife edge 37 and the mark F on the cam. In this position the volume counter 17 is again operated for one thousand units as previously described.

For a maximum fifty pound gauge pressure cam the value of C in Equation (1) becomes $$(2) \qquad C = \frac{14.4 + 50}{14.65} = 4.396$$

when $P_b$ equals .25 lb., so that the advance of register 18 should be 4396 when counter 17 advances 1000. If the reading of counter 18 is not the same as this figure this may be due to the fact that the angular movement of cam 39 is not correctly proportioned to the angular movement of shaft 45. This proportion can be varied by the adjusting screw 59. Turning screw 59 in one direction decreases effective radius 45, 64, while turning in the opposite direction increases this radius, thereby varying the ratio of angular movement of strap 47 and cam 39 as desired. As adjustment of screw 59 will move the cam zero with relation to the pressure coil zero, the screw 52 is turned to rotate strap 47 about shaft 45 to compensate therefor, so that when no pressure is applied to the pressure element 40, the zero mark on the cam and knife edge 37 will coincide. At the higher pressures it is important to compensate for deviation of gases from Boyle's law, and this compensation can be made by using a properly shaped cam, or by suitable adjustment of screw 59. By turning screw 59 to decrease the length of radius 45, 64 a suitable amount the device is compensated for gases whose pressure-volume curves are below the curves for perfect gases. The correct amount of turning of screw 59 is determined by test.

After the zero and maximum pressure positions of the cam have been checked an added check can be taken on the intermediate positions. For example, on a fifty pound pressure range the 1/4 graduation corresponds to 12.5 lbs. gauge, the 1/2 graduation to 25 lbs. gauge, etc. By applying a suitable pressure these intermediate positions can be checked in a similar manner. However, generally it is necessary only to check the absolute zero position at the base pressure and at the maximum pressure limit of the cam. By using the angular markings 0, 1/4, 1/2, etc., and a mark corresponding to the base pressure on the cam, once the instrument is calibrated, it becomes unnecessary to check the apparatus by applying a known pressure. In such case a pressure can be applied sufficient to bring the base pressure mark into coincidence with the knife edge 37, and the counters 17 and 18 can be checked as previously described. The apparatus provides a simple quick and easy way to calibrate the pressure correcting meter.

The invention may be embodied in other specific forms without departing from the spirit or essential characteristics thereof. The present embodiment is therefore to be considered in all respects as illustrative and not descriptive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A testing and calibrating apparatus for a pressure correcting meter of the type including a corrected volume register with means at the bottom of the meter externally accessible of the meter to drive said register, and a pressure responsive element having a connection extending laterally from the meter to be connected externally of the meter to vary the drive of said register from said driving means in proportion to the variation in the pressure of the fluid being metered, said apparatus comprising a hollow casing having a substantially closed top, a raised seat at one end of said casing top to receive the bottom of said meter, means to secure the bottom of said meter to said seat, a motor supported in said casing, a vertical drive shaft on said casing extending through said seat to engage the register driving means at the bottom of the meter when said meter is fitted on said seat whereby rotation of said drive shaft will drive said register, a drive connection for said drive shaft in said casing, manually operable drive means extending externally of said casing, means for selectively driving said drive connection from said motor or said manual means whereby said motor may be used to drive said register quickly until nearly the end of a test or calibration run and the manual means may then be utilized to operate the register to accurately complete the run, and a pressure generating means secured upon the top of said casing adjacent said raised seat and positioned to engage said connection to said pressure responsive element on said meter when said meter is fitted on said seat whereby said element may be subjected to different pressure while said register is being driven.

ALLEN D. MacLEAN.